(12) United States Patent
Hayakawa et al.

(10) Patent No.: US 9,346,936 B2
(45) Date of Patent: May 24, 2016

(54) FLUORORESIN COMPOSITION AND ITS MOLDED PRODUCT

(71) Applicant: DUPONT MITSUI FLUOROCHEMICALS CO LTD

(72) Inventors: Osamu Hayakawa, Shizuoka (JP); Noriyuki Suzuki, Shizuoka (JP)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 16 days.

(21) Appl. No.: 14/251,913

(22) Filed: Apr. 14, 2014

(65) Prior Publication Data

US 2014/0309355 A1 Oct. 16, 2014

(30) Foreign Application Priority Data

Apr. 16, 2013 (JP) ................................ 2013/085952

(51) Int. Cl.
*C08K 3/36* (2006.01)
*C08L 27/18* (2006.01)

(52) U.S. Cl.
CPC .. *C08K 3/36* (2013.01); *C08L 27/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,262,101 A * | 4/1981 | Hartwimmer et al. | | 526/89 |
| 4,316,836 A | 2/1982 | Aufdermarsh, Jr. | | |
| 5,354,611 A * | 10/1994 | Arthur | | C08K 7/28 264/211 |
| 5,595,676 A * | 1/1997 | Barnes et al. | | 252/62.2 |
| 5,824,622 A | 10/1998 | Harmer et al. | | |
| 6,737,490 B2 * | 5/2004 | Sumi | | C08F 14/26 526/247 |
| 8,044,132 B2 | 10/2011 | Maeda et al. | | |
| 2004/0213996 A1 | 10/2004 | Fujiwara et al. | | |
| 2005/0123739 A1 | 6/2005 | Chen-Yang et al. | | |
| 2008/0227904 A1 | 9/2008 | Argasinski et al. | | |
| 2012/0256336 A1 * | 10/2012 | Yano et al. | | 264/4.6 |

FOREIGN PATENT DOCUMENTS

| | | |
|---|---|---|
| JP | 2002-53773 A | 2/2002 |
| JP | 2004-311326 A | 11/2004 |
| JP | 2005-163006 A | 6/2005 |
| JP | 2007-119769 A | 5/2007 |
| JP | 2011-046888 A | 3/2011 |
| WO | 91/04842 A1 | 4/1991 |
| WO | WO 2011002877 A1 * | 1/2011 |

OTHER PUBLICATIONS

Jin et al. "Novel Nafion composite membranes with mesoporous silica nanospheres as inorganic fillers", Journal of Power Sources, 2008, 185, 664-669.*
Liao et al. "Synthesis and characterization of SBA-15 poly(vinylidene fluoride) (PVDF) hybrid membrane", Desalination, 2010, 260, 147-152.*
Kessman et al. "Tribology of non-wetting fluorinated mesoporous silica films", Wear, 2011, 271, 2144-2149.*
Eliane Maier, Authorized Officer, PCT International Search Report and Written Opinion, Aug. 6, 2014, PCT/US2014/034064.
S. Inagaki et al., Synthesis of Highly Ordered Mesoporous Materials from a Layered Polysilicate, J. Chem. Soc., Chem. Commun., 1993, pp. 680-682.

* cited by examiner

*Primary Examiner* — Nicole M Buie-Hatcher
(74) *Attorney, Agent, or Firm* — Keith W. Palmer

(57) ABSTRACT

Disclosed are injection-moldable fluororesin compositions of melt flowable fluororesin and mesoporous silica. The fluororesin compositions are melt flowable and have a melt flow rate of from 2 to 60 g/10 min. The mesoporous silica has an average pore diameter of from 2 to 50 nm, and the pores of the mesoporous silica are filled with the melt flowable fluororesin. The fluororesin compositions have excellent melt moldability for manufacturing molded products from the fluororesin composition that demonstrate high hardness.

11 Claims, No Drawings

FLUORORESIN COMPOSITION AND ITS MOLDED PRODUCT

FIELD OF THE INVENTION

This invention relates to an injection-moldable fluororesin and mesoporous silica composition capable of providing a molded product having excellent melt moldability and high hardness.

BACKGROUND OF THE INVENTION

Fluororesins have excellent chemical resistance, non-tackiness, heat resistance, low frictional coefficient, and electrical insulating properties. However, flexible engineering plastics such as PEEK and PPS, which are hard and can be molded into complex shapes by injection molding, instead find frequent commercial use in articles having a complex shape and requiring hardness.

A technique for improving the hardness of a fluororesin involves filling the fluororesin with a large amount of solid filler. Such filled fluororesin can have enhanced hardness, abrasion resistance, low frictional coefficient, and creep resistance due to the filler, in addition to the original chemical resistance, non-tackiness, heat resistance, low frictional coefficient, and electrical insulating properties of the fluororesin. They are therefore used as various members or seal/gasket materials. However, in recent years, there has been a demand for higher hardness, abrasion resistance, low thermal expandability, and creep resistance in sliding members such as piston rings or seal materials for AT/CVT in the automotive field and in gasket materials in the field of chemical plant equipment. However, current commercial embodiments of filled fluororesin compositions are not satisfactory.

Although melt flowable fluororesins have melt-moldability and excellent processability, in addition to excellent chemical resistance, non-tackiness, heat resistance, low frictional coefficient, and electrical insulating properties, the resins themselves are flexible and are therefore unsuitable for the applications described above. A material can be made hard by blending a solid filler into a melt flowable fluororesin to a high filling ratio, but the melt flow characteristics (e.g., melt flow rate (MFR)) of the fluororesin composition at the time of molding are diminished. Therefore, the melt-moldability, which is a feature of thermally meltable melt flowable fluororesins, is sacrificed, and it becomes difficult to develop the substance into an article with a complex shape. On the other hand, by more finely dispersing fillers into the resin, the interactions between the fillers are enhanced, which improves the hardness or creep resistance of the resin composition. It is already known that a fluororesin composition in which inorganic fine particles are dispersed to a high degree may be obtained by means of co-coagulation of a dispersion of thermally meltable fluororesin and a colloidal solution of inorganic fine particles (see, for example, Japanese Unexamined Patent Application Publication No. 2007-119769A). However, the hardness of a fluororesin composition, in which such inorganic fine particles (i.e., the nano-sized silica particles of JP 2007-119769A) are dispersed to a high degree at a primary particle level, is insufficient. In addition, a hard resin can be prepared by filling a thermosetting polyimide (PI) resin with a filler. However, a PI molded by means of compression molding alone requires the machining of the compression-molded product, and the handling greatly differs from that of thermoplastic resins, which can be shaped easily. Moreover, PI is inadequate in that the non-tackiness and low frictional coefficient are inferior to those of fluororesin.

A silica porous medium having mesopores with a uniform honeycomb shape synthesized using the micellar structure of a surfactant as a mold is known as mesoporous silica (MPS). Production of such is described, for example, in Japanese Unexamined Patent Application Publication No. 2002-053773A, or by Inagaki, S.; Fukushima, Y.; Kuroda, K. in J. Chem. Soc., Chem. Commun. 1993, 8, 680. MPS is widely used for absorbents, a carrier for catalysts, drugs, or the like due to the properties of the porous medium. Specific examples are given in Japanese Unexamined Patent Application Publication No. 2011-046888A, in which MPS is used as a filler for a resin composition, include as an organic resin that becomes a matrix, epoxy resins, phenol resins, polyurethanes, polyimides, unsaturated polyesters, vinyl triazine, crosslinked polyphenylene oxide, and curable polyphenylene ethers. In an embodiment serving as a mode for carrying out the invention, only epoxy resins are described, and there is no mention of fluororesins.

Fluororesins, in particular perfluororesins such as tetrafluoroethylene-perfluoro(alkylvinylether) copolymers (herein also referred to as PFA) and tetrafluoroethylene-hexafluoropropylene copolymers (herein also referred to as FEP), have very low surface energy. Therefore, their affinity to silica is los, as silica has high surface energy. In Japanese Unexamined Patent Application Publication No. 2011-046888A, MPS is subjected to surface hydrophobizing treatment, but the affinity with fluororesins remains low, and the filling of fluororesin into the MPS pores does not occur. In addition, in Japanese Unexamined Patent Application Publication No. 2005-163006A, and Japanese Unexamined Patent Application Publication No. 2004-311326A, composite materials consisting of silica and fluororesins are disclosed, and it is described that these materials can be used as circuit board materials for high-frequency signals. However, these fluororesin compositions are intended to be used as circuit board materials, and the silica pores are not filled with fluororesins since they reduce the dielectric constant. Therefore, these fluororesin compositions do not have the high hardness required for sliding materials, heat-resistant seals, or gasket materials.

SUMMARY OF THE INVENTION

An object of the present invention is to provide an injection-moldable fluororesin composition capable of providing a molded product having excellent moldability and high hardness. As a result of conducting dedicated research in order to solve this problem, the present inventors discovered that the excellent characteristics of a fluororesin, and melt fluidity sufficient for performing melt molding, can be maintained by filling the pores of mesoporous silica with melt flowable fluororesin, and that resulting molded products can provide a material having very high hardness.

The present invention comprises a fluororesin composition containing a melt flowable fluororesin and mesoporous silica, the composition having a melt flow rate of from 2 to 60 g/10 min, the mesoporous silica having an average pore diameter of from 2 to 50 nm, and wherein the pores of the mesoporous silica are filled with the melt flowable fluororesin.

In one embodiment, the fluororesin composition contains the melt flowable fluororesin in an amount of 80 to 95 wt. % and the mesoporous silica in an amount of from 5 to 20 wt. %. In one embodiment, the melt flowable fluororesin has a melt flow rate of at least 30 g/10 min.

The present invention further comprises a fluororesin composition containing a melt flowable fluororesin, mesoporous silica, and a filler different from mesoporous silica, the composition having a melt flow rate of from 2 to 60 g/10 min, the mesoporous silica having an average pore diameter of from 2 to 50 nm, and wherein the mesoporous silica content is from 5 to 20 wt. % of the fluororesin composition, and the filler content is from 1 to 20 wt. % of the fluororesin composition, and wherein the pores of the mesoporous silica are filled with the melt flowable fluororesin.

A molded product molded from the fluororesin composition of the present invention has high Shore hardness (Hs) of at least 75. Accordingly, the molded product of the present invention is effective when used as a sliding member requiring high hardness or a heat-resistant gasket material requiring low thermal expandability at high temperatures.

The present invention can provide an injection-moldable fluororesin composition having excellent moldability. The fluororesin composition of the present invention has very high fluidity due to a high MFR of 2 to 60 g/10 min, which enables the molding of complex parts by injection molding. In addition, the molded product of the present invention exhibits very high hardness with a Shore hardness of at least 75, and the movement of the structure is regulated by MPS, so expansion caused by heat is suppressed, resulting in a low coefficient of thermal expansion. In this way, the molded product of the present invention has high hardness and suppressed thermal expansion even at high temperatures so the molded product can be used as a heat-resistant gasket material or a sliding material.

DETAILED DESCRIPTION OF THE INVENTION

Fluororesin Composition

In one embodiment the present invention is a fluororesin composition containing a melt flowable fluororesin and mesoporous silica.

(A) Melt Flowable Fluororesin

The melt flowable fluororesin used in the present invention can be appropriately selected from resins known as thermally meltable melt flowable fluororesins, examples of which include polymers or copolymers of monomers selected from tetrafluoroethylene, chlorotrifluoroethylene, hexafluoropropylene, perfluoro(alkylvinylether), vinylidene fluoride, and vinyl fluoride or copolymers of these monomers and monomers having double bonds such as ethylene, propylene, butylene, pentene, and hexene or monomers having triple bonds such as acetylene and propyne. Specific examples of melt flowable fluororesins include but are not limited to tetrafluoroethylene-perfluoro(alkylvinylether) copolymers (PFA), tetrafluoroethylene-hexafluoropropylene copolymers (FEP), tetrafluoroethylene-hexafluoropropylene-perfluoro(alkylvinylether) copolymers, tetrafluoroethylene-ethylene copolymers, polyvinylidene fluoride, polychlorotrifluoroethylene, and chlorotrifluoroethylene-ethylene copolymers. PFA is preferred of these melt flowable fluororesins. When PFA is used, the alkyl group of the perfluoro(alkylvinylether) has from 1 to 5 carbons, and more preferably has from 1 to 3 carbons.

In one embodiment the melt flowable fluororesin used in the present invention preferably has a melt flow rate (MFR) of at least 30 g/10 min. In another embodiment the MFR of the melt flowable fluororesin is at least 50 g/10 min. In another embodiment the MFR of the melt flowable fluororesin is at least 80 g/10 min. By selecting a melt flowable fluororesin with a high MFR as a raw material, the pores of the MPS are easily filled by the fluororesin, and the hardness and coefficient of thermal expansion of the resulting resin composition are thereby improved. Typically commercially available resins are fluororesins with an MFR of far less than 30 g/10 min, so their fluidity is low, and the pores of the mesoporous silica (MPS) are not filled by the fluororesin even when used after being melted and kneaded with the mesoporous silica. As a result, such obtained fluororesin compositions using fluororesins having MFRs of less than 30 g/10 min and molded products thereof do not demonstrate sufficient hardness.

The melt flowable fluororesins of the present invention can be produced by a conventionally known methods such as solution polymerization, emulsion polymerization, or suspension polymerization.

(B) Mesoporous Silica (MPS)

Mesoporous silica (MPS) refers herein to porous silica having a porous structure and having an average pore diameter of from 2 to 50 nm (mesopore size). MPS is a silica porous medium having uniform honeycomb-shaped mesopores synthesized using the micellar structure of a surfactant as a mold. MPS has a large specific surface area and pore volume, and the average pore diameter can be variously controlled by the surfactant preparation conditions. MPS is widely used in carriers for absorbents, catalysts, and the like while taking advantage of the properties of the porous medium.

In one embodiment, the average pore diameter of the MPS used in the present invention is at least 2 nm and at most 50 nm, in another embodiment at least 3 nm and at most 30 nm, and in another preferred embodiment at least 4 nm and at most 15 nm. When the pore diameter is at most 2 nm, it becomes difficult for the pores to be filled with the fluororesin, so the insides of the pores are not filled with the fluororesin, and the effects of reinforcing the structure or improving the hardness cannot be achieved. In addition, when the pore diameter is greater than 50 nm, the pores of the MPS are easily filled with the fluororesin, but the contact area between the silica skeleton structure and the fluororesin is insufficient, and the effects of the hardness of the silica skeleton on the hardness or the coefficient of thermal expansion of the fluororesin composition become weak. The surface of the MPS used in the present invention may or not be hydrophobized. When an MPS that is not surface-treated is used, the generation of defects due to foaming is suppressed at the time of melting and kneading at a high temperature of at least 300° C., which is the melting temperature of the fluororesin, thus the surface of the mesoporous silica is preferably not hydrophobized. Ordinarily, silica that is not surface-hydrophobized has reduced dispersibility in the matrix resin, which makes it difficult for the pores of the MPS to be filled with the resin. However, with the present invention, MPS particles that are not surface treated can be uniformly dispersed, and the pores can be filled with the fluororesin.

(C) Composition Ratio of the Resin Composition

As described above, the resin composition of the present invention contains a melt flowable fluororesin and mesoporous silica, and the pores of the mesoporous silica are filled by the melt flowable fluororesin. When the ratio of the mesoporous silica is increased in the total amount of the resin composition, the hardness of a molded product produced from the resin composition can be increased, but the melting fluidity typically decreases when the filler compounding ratio in the resin composition is increased. Therefore, the resin composition of the present invention in one embodiment contains from 80 to 95 wt. % melt flowable fluororesin and from 5 to 20 wt. % mesoporous silica, in another embodiment from 85 to 95 wt. % melt flowable fluororesin and from 5 to 15 wt. % mesoporous silica, and in a preferred embodiment from 85 to 93 wt. % melt flowable fluororesin and from 7 to 15 wt. % mesoporous silica.

(D) MFR of the Resin Composition

In one embodiment the melt flow rate (MFR) of the fluororesin composition of the present invention is from 2 to 60 g/10 min, in another embodiment from 5 to 45 g/10 min, and in a preferred embodiment from 10 to 30 g/10 min. Since the MFR of the resin composition is high, the resin can be used and easily molded into a wide variety of shapes. In addition, a molded product produced from the resin composition of the present invention has high hardness and a low coefficient of thermal expansion since the pores of the mesoporous silica are filled with the melt flowable fluororesin. That is, when the appearance of the resulting composition visually gives off a brown color, it can be evaluated that the pores of the mesoporous silica have been filled by the melt flowable fluororesin. In addition, when the pores of the mesoporous silica are filled with the melt flowable fluororesin, the hardness of the resulting fluororesin composition and a molded product thereof improves. Therefore, it can also be confirmed whether the pores of the mesoporous silica have been filled by the melt flowable fluororesin based on the improvement in hardness. Furthermore, when the pores of the mesoporous silica are filled by the fluororesin, the specific gravity of the resulting fluororesin composition and a molded product thereof tends to increase. Therefore, it can also be confirmed whether the pores of the mesoporous silica have been filled by the fluororesin based on the increase in specific gravity.

(E) Other Additives

A wide range of various additives may also be present in the resin composition of the present invention as necessary. Examples of such additives include polymer processing aids such as catalysts, initiators, antioxidants, thermal stabilizers, foaming agents, ultraviolet stabilizers, organic pigments such as coloring pigments, plasticizers, blocking inhibitors, leveling agents, flame retardants, anti-cratering agents, anti-static agents, and slipping agents. The contents of these additives are not particularly limited, but such optional ingredients may ordinarily be added in an amount of approximately 0.1% to 10% of the resin composition of the present invention.

Fluororesin Composition Containing an Additional Filler

Another embodiment of the present invention is the fluororesin composition described above, further containing an additional filler different from mesoporous silica. The melting fluidity ordinarily decreases when the filler compounding ratio in the resin composition is increased. However, the present inventors discovered that the fluidity—that is, the MFR—of the fluororesin composition can be increased by further adding an additional filler. As a result, it became possible to increase the total content of the mesoporous silica and the additional filler in the fluororesin composition while favorably maintaining the fluidity of the fluororesin composition. The fluidity and hardness of the fluororesin composition of the present invention are dependent on the respective types and compounding ratios of the mesoporous silica and the additional filler. From the perspective of maintaining the hardness of the molded product, the fluororesin composition of the present invention preferably contains from 5 to 20 wt. % of mesoporous silica in the resin composition, as described above. The additional filler is preferably contained at 1 to 20 wt. %, more preferably at 3 to 18 wt. %, and particularly preferably at 5 to 15 wt. % in the resin composition.

An organic filler or inorganic filler may be used as the additional filler to be added in the present invention. Examples of organic fillers include aramid fibers or the like. Examples of inorganic fillers include glass fibers, glass flakes, carbon fibers, graphite, carbon black, alumina fibers, alumina powders, calcium sulfate, calcium carbonate, talc, zinc oxide, titanium oxide, and molybdenum disulfide. Of these, inorganic fillers are preferable, and glass fibers, glass flakes, and carbon fibers are particularly preferable. The pore diameter or fiber length of the filler used in the present invention is preferably approximately from 5 to 150 µm on average.

Production Method of the Fluororesin Composition of the Present Invention

The fluororesin composition of the present invention can be produced by mixing the thermally meltable melt flowable fluororesin and MPS described above, adding optional additional filler, melting the solution at a high temperature, and then melting and kneading the mixture with a melting/kneading device. Fluororesin compositions of silica/fluorine resins produced by co-coagulation are conventionally known, but the fluororesin composition of the present invention can be prepared with a simpler method than co-coagulation, wherein the mixture is melted and kneaded after mixing using a dry blend. By performing melting and kneading with a high shearing force, it is possible to obtain a fluororesin composition in which the pores of the MPS are filled by the fluororesin. More specifically, the fluororesin composition can be produced by melting and kneading a melt flowable fluororesin and mesoporous silica under melting and kneading conditions at a temperature from 250 to 450° C. using various melting and kneading devices such as a twin-screw extruder or a kneading machine.

Molded Product Produced from the Fluororesin Composition of the Present Invention The molded product of the present invention can be produced by molding the fluororesin composition described above. The molded product of the present invention has a high Shore hardness (Hs) of at least 75 and low thermal expandability, so the product is excellent when used as a sliding material or a heat-resistant gasket material.

Test Methods

MFR (Melt Flow Rate)

Using a melt indexer which is ASTM D 1238-95 compliant, after a 5 g sample was loaded into a cylinder maintained at 372±1° C. and held for 5 minutes in the melt indexer (manufactured by Toyo Seiki Seisaku-sho, Ltd.) equipped with a corrosion-resistant cylinder, a die, and a piston compliant with ASTMD1238-95, the sample was extruded through a die orifice under a load of 5 kg (piston and weight), and the extrusion rate of the molten material at this time (g/10 min) was determined as the MFR.

Shore Hardness

The Shore hardness (Hs) of the molded product of the resin composition was measured by pressing the product with a force of at least 5 kg using a durometer manufactured by Kobunshi Keiki Co., Ltd. in accordance with JISK7215, ASTMD2240-68 (Type D).

CTE (Coefficient of Thermal Expansion)

A billet was obtained by means of molten compression molding (1 MPa) at a molding temperature of 350° C. using a compression molding device (Hot press WFA-37, manufactured by Shinto Metal Industries Corporation). A measurement sample with a diameter of 4 mm and a length of 20 mm was cut out from the resulting billet using a lathe. The sample was heated from −10° C. to 270° C. at 5° C./min using a thermomechanical tester (TM-7000, manufactured by Shinku Riko K. K.), and the coefficient of thermal expansion ($10^{-5}/°$ C.) was found in accordance with ASTM D696 by measuring the dimensional changes between 100° C. and 150° C.

EXAMPLES

The raw materials used in the working examples of the present invention and the comparative examples are as described below.

PFA1: MFR: 96 g/10 min. Tetrafluoroethylene/perfluoro-(propylvinylether) copolymer powder obtained by emulsion polymerization.

PFA2: MFR: 36 g/10 min. Tetrafluoroethylene/perfluoro-(propylvinylether) copolymer powder obtained by emulsion polymerization.

PFA3: MFR: 17 g/10 min. (Teflon (registered trademark) PFA 340-J, manufactured by Du Pont-Mitsui Fluorochemicals Co., Ltd.)

MPS1: Mesoporous silica. Admaporous (registered trademark) PC700G (average pore diameter: 4 nm), manufactured by Admatechs Company Limited, surface-untreated grade.

MPS2: Mesoporous silica. Admaporous (registered trademark) PC700G (average pore diameter: 7 nm), manufactured by Admatechs Company Limited, surface-untreated grade.

MPS3: Mesoporous silica. Admaporous (registered trademark) PC700G (average pore diameter: 12 nm), manufactured by Admatechs Company Limited, surface-untreated grade.

Non-porous silica: Colloidal silica PL-7, manufactured by Fuso Chemical Co., Ltd.

Glass fibers 1: PF 20E-001 (fiber length: 20 µm), manufactured by Nitto Boseki Co., Ltd.

Glass fibers 2: PF 80E (fiber length: 80 µm), manufactured by Nitto Boseki Co., Ltd.

Glass flakes: RCF-015, manufactured by Nippon Sheet Glass Co. Ltd.

Carbon fibers: Torayca MLD-30 (fiber length: 30 µm), manufactured by Toray Industries Inc.

Aromatic polyamide (aramid) fibers: Kevlar (fiber length: 100 µm), manufactured by Du Pont-Toray Co., Ltd.

Working Example 1

(1) Preparation of a Powder Mixture (Dry Blend)

A total of 200 g prepared by blending MPS1 (average pore diameter: 4 nm) at a ratio of 20 g per 180 g of a PFA1 powder was loaded into a Wonder Crush Mill (D3V-10, imported from Osaka Chemical Co., Ltd.) and mixed for 1 minute at a revolution speed of 25,000 rpm to obtain a mixed powder.

(2) Preparation of a Fluororesin Composition 80 g of the 200 g of the obtained mixed powder was collected and melted and kneaded for 3 minutes at 380° C. and 60 rpm using a melting/kneading device (manufactured by Toyo Seiki Seisaku-sho, Ltd., KF-70V miniature segment mixer) having five kneading discs to obtain a fluororesin composition. The MFR of the resulting fluororesin composition was measured.

(3) Creation of a Molded Product

A composition produced by melting and kneading was placed in a prescribed mold (dimensions: 55 mm in diameter, 30 mm tall) using a compression molding device (Hot press WFA-37, manufactured by Shinto Metal Industries Corporation), and after the composition was kept at 350° C. for 10 min to melt the resin, the composition was compressed with a pressure of 3.5 MPa until the resin protruded. This was cooled for 15 minutes at room temperature and molded into a disc shape with a diameter of 55 mm and a height of 2 mm. The Shore hardness of the resulting disc-shaped molded product was measured. The composition and mixing conditions of the fluororesin composition are shown in Table 1, and the results of physical property measurements are shown in Table 5.

Working Examples 2 to 4

Fluororesin compositions were obtained under the same conditions as in Working Example 1 with the exception of changing the composition ratios of the thermally meltable fluororesin (PFA1) and MPS1. That is, in Working Examples 2 to 4, the ratios of MPS1 were respectively set to 10 g, 30 g, and 40 g, and the total amount was set to 200 g (the PFA1 ratios were 190 g, 170 g, and 160 g, respectively). In addition, molded products were created from the fluororesin compositions using the same method, and the physical properties thereof were measured. The compositions and mixing conditions of the fluororesin compositions are shown in Table 1, and the results of physical property measurements are shown in Table 5.

Working Example 5

A fluororesin composition was obtained under the same conditions as in Working Example 1 with the exception of using PFA2 as a thermally meltable fluororesin. In addition, a molded product was created from the fluororesin composition using the same method, and the physical properties thereof were measured. The composition and mixing conditions of the fluororesin composition are shown in Table 1, and the results of physical property measurements are shown in Table 5.

Working Example 6

A fluororesin composition was obtained in the same manner as in
Working Example 1 with the exception of using MPS2 (average pore diameter: 7 nm) as a filler. A molded product was created from the fluororesin composition using the same method, and the physical properties thereof were measured. The composition and mixing conditions of the fluororesin composition are shown in Table 1, and the results of physical property measurements are shown in Table 5.

Working Example 7

A fluororesin composition was obtained in the same manner as in Working Example 1 with the exception of using MPS3 (average pore diameter: 12 nm) as a filler. A molded product was created from the fluororesin composition using the same method, and the physical properties thereof were measured. The composition and mixing conditions of the fluororesin composition are shown in Table 1, and the results of physical property measurements are shown in Table 5.

TABLE 1

Compositions and mixing conditions of the present invention

| Working Example | Base resin | | Silica | | Composition ratio | | Mixing conditions |
|---|---|---|---|---|---|---|---|
| | Grade of PFA | MFR g/10 min | Grade of MPS | pore diameter (nm) | Ratio of PFA wt. % | Ratio of MPS wt. % | |
| 1 | PFA1 | 96 | MPS1 | 4 | 90 | 10 | Dry blend |
| 2 | PFA1 | 96 | MPS1 | 4 | 95 | 5 | Dry blend |

TABLE 1-continued

Compositions and mixing conditions of the present invention

| Working Example | Base resin | | Silica | | Composition ratio | | Mixing conditions |
|---|---|---|---|---|---|---|---|
| | Grade of PFA | MFR g/10 min | Grade of MPS | MPS pore diameter (nm) | Ratio of PFA wt. % | Ratio of MPS wt. % | |
| 3 | PFA1 | 96 | MPS1 | 4 | 85 | 15 | Dry blend |
| 4 | PFA1 | 96 | MPS1 | 4 | 80 | 20 | Dry blend |
| 5 | PFA2 | 36 | MPS1 | 4 | 90 | 10 | Dry blend |
| 6 | PFA1 | 96 | MPS2 | 7 | 90 | 10 | Dry blend |
| 7 | PFA1 | 96 | MPS3 | 12 | 90 | 10 | Dry blend |

Working Example 8

20 g of MPS1 (average pore diameter: 4 nm) and 10 g of glass fibers 1 (fiber length: 20 μm) were blended into 170 g of PFA1 powder and were dry-blended. The product was then melted, kneaded, and molded in accordance with the method described in Working Example 1, and the physical properties of the composition and the resulting molded product were measured. The composition and mixing conditions of the fluororesin composition are shown in Table 2, and the results of physical property measurements are shown in Table 5.

Working Examples 9 and 10

As in Working Example 5, PFA1, MPS1, and glass fibers 1 were dry-blended at the compounding ratios shown in Table 2. That is, in Working Examples 9 and 10, MPS1 was compounded at a ratio of 20 g in both cases, and the ratios of glass fibers 1 (fiber length: 20 μm) were respectively set to 14 g and 18 g, while the total amount including PFA1 was set to 200 g (the amount of PFA1 was 166 g in Working Example 9 and 162 g in Working Example 10). The product was then melted, kneaded, and molded in accordance with the method described in Working Example 1, and the physical properties of the composition and the resulting molded product were measured. The composition and mixing conditions of the fluororesin composition are shown in Table 2, and the results of physical property measurements are shown in Table 5.

Working Examples 11 to 13

As in Working Example 5, PFA1, MPS1, and glass fibers 1 were dry-blended at the compounding ratios shown in Table 2. In Working Examples 11 to 13, the amount of MPS1 was set to 24 g in each case, and the total amount including the remaining glass fibers 1 (fiber length: 20 μm) and PFA1 was set to 200 g. That is, in Working Example 11, PFA1 was blended at a ratio of 162 g, and glass fibers 1 were blended at a ratio of 14 g. In addition, in Working Example 12, PFA1 and glass fibers 1 were blended at ratios of 158 g and 18 g, respectively, and in Working Example 13, PFA1 and glass fibers 1 were blended at ratios of 150 g and 26 g, respectively. The product was then melted, kneaded, and molded in accordance with the method described in Working Example 1, and the physical properties of the composition and the resulting molded product were measured. The composition and mixing conditions of the fluororesin composition are shown in Table 2, and the results of physical property measurements are shown in Table 5.

TABLE 2

Compositions and mixing conditions of the present invention

| Working Example | Base resin | | Silica | | Additional filler Type | Composition ratio | | | Mixing conditions |
|---|---|---|---|---|---|---|---|---|---|
| | Grade of PFA | MFR (g/10 min) | Grade of MPS | MPS pore diameter (nm) | | Ratio of PFA wt. % | Ratio of MPS wt. % | Wt. % of the additional filler | |
| 8 | PFA1 | 96 | MPS1 | 4 | Glass fibers 1 20 μm | 85 | 10 | 5 | Dry blend |
| 9 | PFA1 | 96 | MPS1 | 4 | Glass fibers 1 20 μm | 83 | 10 | 7 | Dry blend |
| 10 | PFA1 | 96 | MPS1 | 4 | Glass fibers 1 20 μm | 81 | 10 | 9 | Dry blend |
| 11 | PFA1 | 96 | MPS1 | 4 | Glass fibers 1 20 μm | 81 | 12 | 7 | Dry blend |
| 12 | PFA1 | 96 | MPS1 | 4 | Glass fibers 1 20 μm | 79 | 12 | 9 | Dry blend |
| 13 | PFA1 | 96 | MPS1 | 4 | Glass fibers 1 20 μm | 75 | 12 | 13 | Dry blend |

Working Example 14

With the exception of using glass fibers 2 (fiber length: 80 μm) as a second filler, the ingredients were dry-blended, melted and kneaded, and molded in the same manner as in Working Example 8, and the physical properties of the composition and the resulting molded product were measured. The composition and mixing conditions of the fluororesin composition are shown in Table 3, and the results of physical property measurements are shown in Table 5.

Working Example 15

With the exception of using glass flakes as a second filler, the ingredients were dry-blended, melted and kneaded, and molded in the same manner as in Working Example 8, and the physical properties of the composition and the resulting molded product were measured. The composition and mixing conditions of the fluororesin composition are shown in Table 3, and the results of physical property measurements are shown in Table 5.

Working Example 16

With the exception of using carbon fibers (fiber length: 30 μm) as a second filler, the ingredients were dry-blended, melted and kneaded, and molded in the same manner as in Working Example 8, and the physical properties of the composition and the resulting molded product were measured. The composition and mixing conditions of the fluororesin composition are shown in Table 3, and the results of physical property measurements are shown in Table 5.

Working Example 17

With the exception of using aromatic polyamide fibers (fiber length: 100 μm) as a second filler, the ingredients were dry-blended, melted and kneaded, and molded in the same manner as in Working Example 8, and the physical properties of the composition and the resulting molded product were measured. The composition and mixing conditions of the fluororesin composition are shown in Table 3, and the results of physical property measurements are shown in Table 5.

g were coagulated, filtered, and dried in accordance with the method described in Japanese Unexamined Patent Application Publication No. 2007-119769A to obtain a fluororesin composition. The physical properties of the resulting fluororesin composition were measured in the same manner as in Working Example 1. The compositions and mixing conditions of the fluororesin compositions are shown in Table 4, and the results of physical property measurements are shown in Table 5.

Comparative Example 5

A fluororesin composition was obtained in the same manner as in Comparative Example 4 with the exception of using an aqueous dispersion after the polymerization of PFA3 as a fluororesin, and the physical properties were measured in the same manner as in Working Example 1. The compositions and mixing conditions of the fluororesin compositions are shown in Table 4, and the results of physical property measurements are shown in Table 5.

Comparative Example 6

A colloidal solution of non-porous silica was placed in a heat-resistant petri dish and dried for 10 hours in a hot air drier set to 150° C. to obtain a dried powder of non-porous silica.

TABLE 3

Compositions and mixing conditions of the present invention

| | Base resin | | Silica | | | Composition ratio | | | |
|---|---|---|---|---|---|---|---|---|---|
| Working Example | Grade of PFA | MFR (g/10 min) | Grade of MPS | MPS pore diameter (nm) | Additional filler Type | Ratio of PFA wt. % | Ratio of MPS wt. % | Wt. % of the additional filler | Mixing conditions |
| 14 | PFA1 | 96 | MPS1 | 4 | Glass fibers 2 80 μm | 85 | 10 | 5 | Dry blend |
| 15 | PFA1 | 96 | MPS1 | 4 | Glass flakes 15 μm | 85 | 10 | 5 | Dry blend |
| 16 | PFA1 | 96 | MPS1 | 4 | Carbon fibers 30 μm | 85 | 10 | 5 | Dry blend |
| 17 | PFA1 | 96 | MPS1 | 4 | Aramide fibers 100 μm | 85 | 10 | 5 | Dry blend |

Comparative Examples 1 to 3

After MFR measurements and melting/compression molding were performed in accordance with the method described in Working Example 1 for PFA1, PFA2, and PFA3 without adding a filler, the Shore hardness was measured. The compositions and mixing conditions of the fluororesin compositions are shown in Table 4, and the results of physical property measurements are shown in Table 5.

Comparative Example 4

A fluororesin composition was obtained by means of co-coagulation after mixing a fluororesin aqueous dispersion obtained at the time of the polymerization of PFA1 and a colloidal solution of non-porous silica. That is, a fluororesin aqueous dispersion obtained at the time of the polymerization of PFA1 with a solid resin content of 90 g and a colloidal solution of non-porous silica with a solid silica content of 10

This dried powder of non-porous silica and PFA1 were mixed, melted, and kneaded in the same manner as in Working Example 1, and the physical properties thereof were measured. The compositions and mixing conditions of the fluororesin compositions are shown in Table 4, and the results of physical property measurements are shown in Table 5.

Comparative Example 7

PFA3 was used as a melt flowable fluororesin, and MPS1 was used as a filler. That is, MPS1 was blended at a ratio of 18 g per 182 g of a powder of PFA3, and after the mixture was melted and kneaded in accordance with the same procedure as in Working Example 1, various physical properties of the resulting fluororesin composition were measured. The compositions and mixing conditions of the fluororesin compositions are shown in Table 4, and the results of physical property measurements are shown in Table 5.

Comparative Example 8

A fluororesin composition was obtained using the same raw materials as in Comparative Example 7 described above while changing the ratios thereof. That is, MPS1 was blended at a ratio of 20 g per 180 g of a powder of PFA3, and after the mixture was melted and kneaded in accordance with the same procedure as in Working Example 1, various physical properties of the resulting fluororesin composition were measured. The compositions and mixing conditions of the fluororesin compositions are shown in Table 4, and the results of physical property measurements are shown in Table 5.

TABLE 4

Compositions and mixing conditions of comparative examples

| Comparative Example | Base resin Grade of PFA | Base resin MFR g/10 min | Silica Type of silica | Silica MPS pore diameter (nm) | Composition ratio Ratio of PFA wt. % | Composition ratio Ratio of silica wt. % | Mixing conditions |
|---|---|---|---|---|---|---|---|
| 1 | PFA1 | 96 | — | | 100 | | — |
| 2 | PFA2 | 36 | — | | 100 | | — |
| 3 | PFA3 | 17 | — | | 100 | | — |
| 4 | PFA1 | 96 | Non-porous silica | — | 90 | 10 | Co-coagulation |
| 5 | PFA3 | 17 | Non-porous silica | — | 90 | 10 | Co-coagulation |
| 6 | PFA1 | 96 | Non-porous silica | — | 90 | 10 | Dry blend |
| 7 | PFA3 | 17 | MPS1 | 4 | 91 | 9 | Dry blend |
| 8 | PFA3 | 17 | MPS1 | 4 | 90 | 10 | Dry blend |

TABLE 5

Evaluation results: MFR and external appearance of the compositions and Shore hardness and coefficients of thermal expansion of the molded products

| Example (W = working, C = Comparative) | MFR (g/10 min) | Shore hardness (Hs) | Thermal Expansion Coefficient ($\times 10^{-5}$) 100° C. | Thermal Expansion Coefficient ($\times 10^{-5}$) 200° C. | Appearance (color) |
|---|---|---|---|---|---|
| W 1 | 27.2 | 84 | 9.2 | 11.7 | Dark brown |
| W 2 | 59.8 | 75 | | | Brown |
| W 3 | 15.4 | 81 | | | Dark brown |
| W 4 | 2.3 | 86 | | | Dark brown |
| W 5 | 13.3 | 75 | | | Brown |
| W 6 | 17.3 | 76 | | | Brown |
| W 7 | 23.7 | 75 | | | Brown |
| W 8 | 37 | 77 | 9.5 | 12.3 | Brown |
| W 9 | 35 | 77 | 8.2 | 10.5 | Brown |
| W 10 | 33 | 79 | 9.1 | 11.5 | Brown |
| W 11 | 25 | 80 | 8.6 | 10.9 | Brown |
| W 12 | 24 | 80 | | | Brown |
| W 13 | 16 | 82 | 8.3 | 10.4 | Brown |
| W 14 | 38.6 | 78 | | | Brown |
| W 15 | 36.9 | 75 | | | Brown |
| W 16 | 28.7 | 78 | | | Brown |
| W 17 | 25.9 | 78 | | | Brown |
| C 1 | 90 | 67 | | | White |
| C 2 | 36 | 67 | | | White |
| C 3 | 15 | 67 | 12.2 | 14.9 | White |
| C 4 | 50.3 | 70 | | | White |
| C 5 | 10.1 | 72 | 10.6 | 13 | White |
| C 6 | 55.7 | 71 | | | White |
| C 7 | 7.7 | 70 | 10.3 | 12.7 | Light brown |
| C 8 | 6.37 | 73 | | | Light brown |

The compositions obtained in Working Examples 1, 3, and 4 yielded a dark brown color. The compositions obtained in Working Examples 2 and 5 to 17 all yielded a brown color. On the other hand, the compositions obtained in Comparative Examples 4 to 6 all retained the same white color as the original fluororesin or silica. In addition, the fluororesin compositions obtained in Comparative Examples 7 and 8 yielded a light brown color. This is considered to have been due to the fact that the pores of the MPS were not filled with PFA due to the low MFR—that is, low fluidity—of the PFA that was used.

The present invention can provide an injection-moldable fluororesin composition capable of providing a molded product having excellent moldability and high hardness. In addition, the molded product of the present invention has high hardness and a low coefficient of thermal expansion, so the product may be widely used as a sliding material or a heat-resistant gasket material. Therefore, the present invention can be used industrially.

What is claimed is:

1. A fluororesin composition comprising from 80 to 95 weight percent of melt flowable fluororesin and from 5 to 20 weight percent mesoporous silica, said fluororesin composition having a melt flow rate of from 2 to 60 g/10 min, said melt flowable fluororesin comprising tetrafluoroethylene-perfluoro(alkylvinylether) copolymer having a melt flow rate of at least 30 g/min, wherein said perfluoroalkyl group of said perfluoro(alkylvinylether) has from 1 to 5 carbons, said mesoporous silica having an average pore diameter of from 2 to 50 nm, and wherein the pores of said mesoporous silica are filled with said melt flowable fluororesin.

2. The fluororesin composition of claim 1, wherein the melt flow rate of said melt flowable fluororesin is at least 50 g/10 min.

3. The fluororesin composition of claim 1, wherein the melt flow rate of said melt flowable fluororesin is at least 80 g/10 min.

4. The fluororesin composition of claim 1, wherein the mesoporous silica has an average pore diameter of from 3 to 30 nm.

5. The fluororesin composition of claim 1, wherein the mesoporous silica has an average pore diameter of from 4 to 15 nm.

6. The fluororesin composition of claim 1, wherein the mesoporous silica is not surface-hydrophobized.

7. The fluororesin composition of claim 1 further comprising a filler different from said mesoporous silica, wherein said fluororesin composition comprises from 5 to 20 weight percent of said mesoporous silica and from 1 to 20 weight percent of said filler.

8. The fluororesin composition of claim 7 wherein said filler different from said mesoporous silica is selected from the group consisting of glass fiber, glass flake, carbon fiber and aramid fiber.

9. A heat-resistant seal or gasket comprising the molded product according to claim 8.

10. A molded product melt molded from a fluororesin composition according to claim 1 having a Shore hardness (Hs) of at least 75.

11. A sliding member comprising the molded product according to claim 10.

* * * * *